Patented Aug. 15, 1950

2,519,199

UNITED STATES PATENT OFFICE 2,519,199

SYNTHESIS OF VINYL FLUORIDES

Leroy Frank Salisbury, Wilmington, Del., assignor to E. I. du Pont de Nemours & Company, Wilmington, Del., a corporation of Delaware No Drawing. Original application October 29, 1943, Serial No. 508,243. Divided and this application March 26, 1947, Serial No. 737,411

6 Claims. (Cl. 260—653)

This invention relates to novel catalyst compositions useful in synthesizing organic compounds, and to novel methods for preparing compounds.

More particularly, the invention relates to new catalyst compositions advantageously useful in promoting the conversion of hydrocarbons containing an acetylenic unsaturation to the corresponding substituted or unsubstituted vinyl fluoride, e. g., vinyl fluoride, fluoroprene (fluoro-2-butadiene-1,3), said catalyst comprising charcoal-supported mercury oxide at least partially combined chemically with an oxide of nitrogen.

Many catalysts consisting of catalytically-active metals or their oxides, either alone or supported on suitable substrates, are already known. Catalysts containing mercury oxide, prepared by impregnating charcoal with a suspension of mercury oxide or by formation of the oxide in situ on the charcoal by metathesis or decomposition of certain mercury salts other than the nitrate, are also known and have been specifically suggested as useful in the manufacture of acetaldehyde from acetylene. When employed in vinyl fluoride syntheses, however, these prior types of catalysts prove very unsatisfactory because they are undesirably low in efficiency, activity and durability.

I have discovered that the disadvantages inherent in prior catalysts, especially those contemplated for use in vinyl fluoride syntheses, can be readily overcome. A salient object of my invention, therefore, is to provide a new and improved type of catalytic composition outstandingly useful in the synthesis of unsaturated fluorohydrocarbons, especially vinyl fluoride, fluoroprene, and the like. A particular object of the invention is to provide a novel, improved, highly active, durable type of catalytic composition comprising mercury oxide at least partially combined chemically with an oxide of nitrogen supported on charcoal. A further object is to provide a catalyst composition especially useful and efficient in the condensation of an acetylene with hydrogen fluoride. Other objects and advantages of the invention will be apparent from the ensuing description.

These and other objects are attainable in this invention which comprises synthesizing a vinyl fluoride in the presence of a novel catalytic composition containing mercury oxide at least partially combined chemically with an oxide of nitrogen, supported on a carbon-containing carrier.

In a more specific and preferred embodiment, the invention comprises synthesizing vinyl fluoride in the presence of a catalytic composition consisting of mercury oxide at least partially combined chemically with an oxide of nitrogen, preferably in the form of basic mercury nitrate, supported on charcoal.

In one practical adaptation of the invention, granular charcoal is suitably impregnated with a mercury nitrate solution, following which the impregnated charcoal is roasted in a suitable reaction vessel or chamber at temperatures ranging from about 95° C. to 200° C. The roasting operation is conducted under conditions providing for changing the atmosphere about the heated mass about every five minutes, this being conveniently effected by passage of a dry, gaseous medium such as air through the reaction mass. Roasting is continued until either free mercury appears in the colder portions of the exit end of the reaction zone or retort, or until the moisture content of the mass under treatment is below about 2%, and preferably below 1%. The charcoal mass is then cooled rapidly by removal from the heating zone.

Alternatively, the roasting operation may be conducted under a reduced or diminished pressure of from about 1 to 30 mm. of mercury, in which event circulation of the dry air or other gas through the retort is dispensed with. At the conclusion of the roasting which is marked by the appearance of free mercury or by a vigorous evolution of gases, or both, or by a decrease in the moisture content of the mass to below 2%, the catalyst is partially cooled by removal from the heating zone and is then blown with dry nitrogen or air.

The resulting catalytic composition will be found to contain from about 20–100% of the mercury originally present in the salt, together with varying amounts of chemically-combined nitrogen, and after preparation is conveniently stored out of contact with moisture until required for use. Because of its more active and durable nature, the resulting catalyst will be found to be especially efficient in the condensation of an acetylene with hydrogen fluoride, e. g., in the synthesis of vinyl fluoride from acetylene and hydrogen fluoride and in the synthesis of fluoroprene from monovinylacetylene and hydrogen fluoride.

To a clearer understanding of the invention, the following specific examples are given, but the invention is obviously not restricted to these examples:

Example I

Five liters of charcoal are impregnated with mercuric nitrate equivalent to 100 grams of mercuric oxide per liter, the volume of the mercuric nitrate solution being just sufficient to wet the charcoal. The impregnated charcoal is then dried for 20 hours at 90° to 100° C. and atmospheric pressure, for an additional 20 hours at 90°, to 100° C. and 10 to 30 mm. of mercury pressure, and finally for 20 hours at 95° to 100° C. and 1 to 3 mm. of mercury pressure. During this period oxides of nitrogen are evolved. Analysis shows that all of the mercury originally present is retained in the dried catalyst and that the atomic ratio of nitrogen to mercury is 0.55.

Vinyl fluoride is prepared from acetylene and hydrogen fluoride by passing a gaseous mixture of acetylene and hydrogen fluoride in 1 to 1.5 molar ratio over a catalyst prepared as just described at a space velocity of 150 volumes of gas per unit volume of catalyst per hour. The catalyst is contained in a steel tube jacketed with circulating water at 40° C. The gases leaving the catalyst tube are passed first through a condenser at 0° C., then through a soda lime tower to remove hydrogen fluoride, and then through condensers at −80° C. to condense vinyl fluoride. After an initial period marked by strong absorption of the reactant gases by the catalyst, the volume of product gases reaches almost the theoretical volume and the product is quantitatively free of acetylene. The condensed vinyl fluoride contains less than 1% of 1,1-difluoroethane. The activity of the catalyst remains constant over a period of many hours.

By way of contrast, catalysts prepared by impregnating charcoal with a water suspension of mercuric oxide followed by drying, or by impregnating charcoal first with mercuric chloride and then with sodium hydroxide, followed by thorough washing and drying, when tested under conditions similar to those described above, give incomplete conversion of the acetylene to vinyl fluoride and are rapidly deactivated.

A suitable form of apparatus for use in the synthesis of fluoroprenes consists of a reactor, which, for small scale operation, may be constructed from a piece of iron pipe, and which contains the catalyst. The reactor may be equipped with an internal temperature measuring device and it is preferably immersed in a bath of a suitable liquid, e. g., water, so that the internal temperature may be controlled. The gaseous mixture, after contact with the catalyst, passes through an absorbent for the excess hydrogen fluoride, if any, such as granular soda lime, a drier, and finally a trap cooled with solid carbon dioxide-acetone mixture. The reaction product, which collects in the cold trap together with any unreacted monovinylacetylene, is separated into its individual components by fractional distillation.

For efficient operation, it is essential that the reacting gases not be allowed to mix until they enter the reaction chamber. If this precaution is not observed, i. e., if the gases are mixed before they enter the reactor, the reaction between vinylacetylene and hydrogen fluoride proceeds as usual, but the feed line to the reactor soon becomes plugged with a hard brittle solid containing less than 10% fluorine. This unwanted reaction is sometimes so rapid that the run must be stopped and the apparatus dismantled within one hour from the start of the operation. One practical way to overcome this serious disadvantage is to introduce the gases in the reactor separately, e. g., through a T-fitting at the entry end of the reactor. This simple device has the very unexpected result of completely eliminating stoppage which takes place if the gases are mixed beforehand. The gases can, however, be mixed before they come in contact with the catalyst, provided that this is done over a granular material such as charcoal. For example, the T-fitting at the entry end of the reactor may be and preferably is filled with dry, granulated charcoal or with the catalyst itself. In practice, anhydrous hydrogen fluoride is metered and led to one end of the T-fitting, and anhydrous monovinylacetylene is also metered and led to the other end of the fitting. An inert gas such as nitrogen may be mixed with either the hydrogen fluoride or the monovinylacetylene. The use of such an inert diluent gas appears to be beneficial in the reaction.

While a form of apparatus suitable for use on a small scale has been described, the operation may be conducted successfully in any appropriate apparatus provided the precautions indicated above are observed.

In the following examples the apparatus used is that described above, and the reacting gases are mixed only when they enter the reactor. The T-fitting at the entrance of the reactor is filled either with the catalyst itself or with dry granulated charcoal.

*Example II*

A mixture of about 24 parts of dry monovinylacetylene, 10 parts of gaseous anhydrous hydrogen fluoride, and 40 parts of dry nitrogen is passed for 7 hours over a catalyst at a contact time of about 45 seconds, at an external temperature of 85° C. and at atmospheric pressure. Fluoroprene is obtained in 80% yield. Said catalyst is prepared by impregnating charcoal with mercuric nitrate, and heating the impregnated charcoal under reduced pressure at about 200° C. The finished catalyst contains 12 parts of mercuric oxide per 1000 parts by volume of catalyst.

The middle cut obtained by fractionating the crude effluent products obtained by the above process is rich in monovinylacetylene and fluoroprene. This cut may be recycled with additional hydrogen fluoride and in this way there is obtained a product which is richer in fluoroprene than that resulting from a single pass of hydrogen fluoride and monovinylacetylene through the reactor. This recycling operation also has the advantage that essentially all of the monovinylacetylene is consumed. The example which follows illustrates this aspect of the invention.

A mixture of dry gases consisting of about 20.7 parts of monovinylacetylene, 4.4 parts of fluoroprene, 20.3 parts of nitrogen, and 8.2 parts of hydrogen fluoride is passed at a contact time of 40 seconds and at an external temperature of 40° C. over the catalyst prepared as described above. After 12.8 hours of operation, during which a total of 2070 parts of monovinylacetylene and 434 parts of fluoroprene are introduced, there is obtained 2455 parts of a product containing only 9% of unconverted monovinylacetylene. The yield of fluoroprene is 68%.

*Example III*

Two and one-half liters of moist charcoal is impregnated with mercuric nitrate equal to 100 grams of mercuric oxide per liter and roasted in an oven at 200° C. at atmospheric pressure with a stream of dry air (600 cc. per minute) passing through the charcoal. As soon as free mercury appears in the exit end of the reaction vessel, heating is discontinued and the vessel is removed from the oven. The finished catalyst contains 34.7 grams of mercury and 1.04 grams of nitrogen per liter or an atomic ratio of mercury to nitrogen of 2.3.

Methyl fluoroprene is prepared by passing 409 parts by weight of 3-methyl monovinylacetylene and 398 parts by weight of dry hydrogen fluoride, each diluted with an equal volume of nitrogen, during five hours without preliminary mixing, over a catalyst prepared in the manner just described maintained at 90-100° C. The reaction products, after passage in gaseous form through soda-lime to remove hydrogen fluoride and then over calcium chloride to remove the water thus introduced, give on condensation 407 parts by weight of a liquid from which 181 parts of pure methyl fluoroprene are isolated by fractional distillation. Methyl fluoroprene is a colorless liquid, boiling at 47.3-47.5° C. and has a refractive index of $N_D^{25}=1.3970$ and a density of $d_4^{25}=0.847$, both measured at 25° C. Its elementary analysis corresponded to the formula $C_5H_7F$. It reacts with maleic anhydride to give a dibasic acid $C_9H_{11}O_4F$ (melting point 183-4° C.). This indicates that it is a conjugated diene.

*Example IV*

Fluoroprene is prepared from monovinylacetylene and hydrogen fluoride and with substantially equal yields and conversions, by duplicating Example II, except that magnesium fluoride is employed as a support for the catalyst.

As a carrier or support for my novel catalyst, charcoal derived from the incomplete combustion of animal or vegetable matter, e. g., wood, bones, nut shells, cocoanut, etc., is preferred for use. The active charcoal may be in granular or finely-divided condition. When used in a finely-divided state, a settling chamber must be attached to the furnace or heating element in order to permit the charcoal dust to settle out of the gas stream during preparation. Another excellent support comprises magnesium fluoride, the use of which will be found to advantageously promote the activity and prolong the effectiveness of the catalyst and reduce mercury loss during the roasting operation.

Although basic mercury nitrate comprises a preferred type of mercury salt for use in my invention, other forms of mercury nitrate salts, as well as mixtures thereof, can also be used. Thus, both the mercuric and mercurous nitrate salts are usefully employable herein, included among which may be mentioned mercuric nitrate ($Hg(NO_3)_2$); the various basic mercuric nitrates, such as $2Hg(OH).NO_3.H_2O$; $Hg(NO_3)_2.2HgO.H_2O$; and mercurous nitrate, $HgNO_3.2H_2O$, etc.

Similarly, though temperatures ranging from 95°-200° C. have been mentioned as utilizable in the invention, the roasting temperature to which the impregnated carbon mass may be subjected during preparation of the catalyst may range to as low as about 90° C. When temperatures above 200° C. are employed in the roasting step, decomposition of the mercury compound will proceed so rapidly that extensive, undesired losses occur through formation of free mercury. Hence, the use of temperatures above 200° C. is to be avoided where optimum results are desired.

The roasting operation may be conducted at either atmospheric, superatmospheric or subatmospheric pressures. For reasons of economy, I prefer to operate at atmospheric pressure in which instance a stream of dry air passing through the charcoal is used to remove moisture and the gases given off during the roasting. This is also desirable when superatmospheric pressures are employed, but is unnecessary when subatmospheric pressures prevail, since any vapors evolved are removed by the vacuum system.

Iron nitrate or other metallic nitrates may be used in conjunction with the mercury compound provided they decompose at 200° C. or below. Suitable examples of such nitrates are those of bismuth, nickel, cobalt, cerium, chromium, copper, beryllium, tellurium and thallium, as well as the nitrates of the rare earth metals.

As already noted, my novel catalytic compositions are especially useful and efficient in the condensation of an acetylene with hydrogen fluoride to obtain a vinyl fluoride, e. g., in the synthesis of vinyl fluoride from acetylene and hydrogen fluoride, in synthesizing fluoroprene (fluoro-2-butadiene-1,3) from monovinyl acetylene and hydrogen fluoride, and in the preparation of methyl fluoroprene from 3-methyl monovinylacetylene and hydrogen fluoride. These unsaturated fluoro hydrocarbons are of considerable technical importance and commercial value, fluoroprene being particularly important as an intermediate in the preparation of rubber-like polymers possessing very useful and unusual properties. Thus, the fluoroprene can be cured, after addition of suitable compounding ingredients, to yield strong, highly-elastic vulcanizates, such as by the following polymerization method:

A mixture of 100 parts of fluoroprene, 6.1 parts of a 65% solution of the sodium salt of a sulfuric ester of oleyl acetate, 0.5 part of a condensation product of formaldehyde and sodium naphthalene sulfonate prepared according to U. S. Patent 1,336,759, one part of sodium para-toluene sulfinate, 0.64 part of concentrated hydrochloric acid, and 230 parts of water is emulsified by agitation in a sealed vessel and heated at about 40° C. for about 18 hours. The resulting latex is treated with 4 parts of a 50% aqueous dispersion of a 55:45 eutectic mixture of phenyl alphanaphthylamine and diphenylamine and coagulated by pouring into brine. The coagulated fluoroprene polymer is washed with water and dried. The dried polymer is compounded by milling with 2.3 parts of the cyclohexylammonium salt of N-cyclo-hexyl dithiocarbamic acid, 11.5 parts of rosin, 23 parts of magnesium oxide, 83 parts of reinforcing carbon, and 11.5 parts of zinc oxide for 280 parts of polymer, and cured for 30 minutes at 140° C. The cured polyfluoroprene is tough, rubbery, elastic, and can be stretched 300%. The resulting product can be used instead of rubber in many instances, and can also be used in other applications requiring an elastic substance for which natural rubber is less suitable, for example, in applications requiring unusual oil and freeze resistance. Polyfluoroprene is also highly resistant to the action of light, heat and many chemicals, and since rubber is readily degraded by oil, heat and light, cured polyfluoroprene can thus be used for many applications for which natural rubber is unsuited. Polyfluoroprene can also be used to coat fabrics by any of the known processes, such as calendering, laminating, spreading or impregnating.

While notably useful in vinyl fluoride, fluoroprene, and methyl fluoroprene synthesis, my novel catalytic composition is generally useful for promoting conversions of hydrocarbons containing an acetylenic unsaturation (including acetylene, methyl acetylene, phenyl acetylene and substituted monovinylacetylenes of the formula

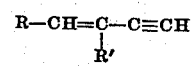

wherein at least one of the radicals R and R' is a monovalent, saturated hydrocarbon radical, provided the molecular weight of the substituted monovinylacetylene does not exceed 150. For example, either R or R' may be methyl, ethyl, propyl, butyl, isobutyl, amyl, hexyl, cyclohexyl, etc.) to the corresponding substituted or unsubstituted vinyl fluorides. Conversion of the hydrocarbon can be suitably effected by passing the hydrocarbon-hydrogen fluoride reaction mixture over the catalytic composition, preferably while in the vapor phase, at a controlled rate of flow. The reaction may be conducted at any desired temperature, the preferred temperature range (internal temperature at the hottest point) being from about 20° C. to about 100° C. Higher temperatures, such as 150° C. or even higher, may be used but they are not recommended since the catalyst becomes less active and/or unstable at such temperatures. In general, I prefer in these reactions to use substantially chemically equivalent quantities of hydrogen fluoride and the acetylenic compound, i. e., mol for mol, in order to obtain maximum yields of the desired vinyl fluoride. However, an excess of either reactant may be used, if desired. In instances of fluoroprene synthesis, an increase in the yield of 3,3-difluoro-butene-1 may be effected by increasing the proportions of hydrogen fluoride used. The conversion reaction is preferably effected at atmospheric pressure, but subatmospheric or super-atmospheric pressures may be used, if desired. The only limitation is that the reactants and products must remain gaseous under the combination of temperature and pressure employed.

This application is a division of my copending application Ser. No. 508,243, filed October 29, 1943.

I claim as my invention:

1. A process for synthesizing fluoroprene which comprises reacting in the vapor phase and at a temperature ranging from about 20° C. to 100° C. a mixture of monovinylacetylene and hydrogen fluoride in contact with a durable conversion catalyst comprising charcoal-supported mercury oxide at least partially combined chemically with an oxide of nitrogen, said catalyst having been prepared by impregnating charcoal with a mercury nitrate solution, roasting the resulting product at temperatures ranging from about 90–200° C. until free mercury appears in the exit of the reaction zone where said roasting operation is conducted, and then cooling and recovering the resulting catalytic composition.

2. A process for synthesizing fluoroprene which comprises reacting in the vapor phase and at a temperature ranging from about 20° C. to 100° C. a mixture of monovinylacetylene and hydrogen fluoride in contact with a durable conversion catalyst comprising charcoal-supported mercury oxide at least partially combined chemically with an oxide of nitrogen, said catalyst having been prepared by impregnating moist charcoal with a solution of mercuric nitrate, roasting the resulting product at atmospheric pressure and a temperature of about 200° C. until free mercury appears in the exit of the reaction zone where said roasting operation is conducted, during said roasting passing a stream of dry air through the reaction mass, and then cooling and recovering the resulting catalytic composition.

3. A process for synthesizing a vinyl fluoride which comprises subjecting an acetylenic hydrocarbon compound in admixture with hydrogen fluoride to contact in the vapor phase and at a temperature ranging from about 20° C. to 100° C. with a catalyst comprising a basic mercury nitrate supported on charcoal as a carrier, said catalyst having been prepared by impregnating charcoal with a mercury nitrate solution, roasting the resulting product at temperatures ranging from about 90–200° C. until free mercury appears in the exit of the reaction zone where said roasting operation is conducted, and then cooling and recovering the resulting catalytic composition.

4. A process for the synthesis of a vinyl fluoride which comprises subjecting an acetylenic hydrocarbon compound, in admixture with hydrogen fluoride, to contact in the vapor phase with a catalyst composition comprising mercury oxide which is at least partially combined chemically with an oxide of nitrogen supported on a carrier which is inert toward said acetylenic hydrocarbon compound and hydrogen fluoride, said catalyst composition being the product obtained by wetting said carrier with a mercury nitrate solution and then heating the resulting composition until mercury appears in the exit end of the reaction zone in which the heating is conducted.

5. A process for the synthesis of a vinyl fluoride which comprises subjecting an acetylenic hydrocarbon compound, in admixture with hydrogen fluoride, to contact in the vapor phase with a catalyst composition comprising mercury oxide which is at least partially combined chemically with an oxide of nitrogen supported on a carrier which is inert toward said acetylenic hydrocarbon compound and hydrogen fluoride, said catalyst composition being the product obtained by wetting a carbon-containing carrier with a mercury nitrate solution and then heating the resulting composition at temperatures ranging from 90° C.–200° C. until free mercury appears in the exit end of the reaction zone in which the heating is conducted, and then recovering the resulting catalytic composition.

6. A process for synthesizing a vinyl fluoride which comprises subjecting an acetylenic hydrocarbon compound in admixture with hydrogen fluoride to contact in the vapor phase and at temperatures ranging from about 20° C. to 100° C. with a catalyst comprising a basic mercury nitrate supported on a carrier which is inert toward said acetylenic hydrocarbon compound, said catalyst having been prepared by impregnating said carrier with a mercury nitrate solution, roasting the resulting product at temperatures ranging from about 90–200° C. until free mercury appears in the exit of the reaction zone where said roasting operation is conducted, and then cooling and recovering the resulting catalytic composition.

LEROY FRANK SALISBURY.

REFERENCES CITED

The following references are of record in the file of this patent:

UNITED STATES PATENTS

| Number | Name | Date |
|---|---|---|
| 1,939,647 | Arnold et al. | Dec. 19, 1933 |
| 1,950,431 | Carothers et al. | Mar. 13, 1934 |
| 2,118,901 | Soll | May 31, 1938 |
| 2,243,404 | Voorhies, Jr. | May 27, 1941 |

OTHER REFERENCES

Thorpe: Dictionary of Applied Chemistry, vol. III, Longmans, Green and Company, N. Y. (1916), page 446.